US010576826B2

(12) United States Patent
Ellgas et al.

(10) Patent No.: US 10,576,826 B2
(45) Date of Patent: Mar. 3, 2020

(54) METHOD FOR CONTROLLING ELECTRICAL CHARGING OF A GROUP OF VEHICLES

(71) Applicant: Bayerische Motoren Werke Aktiengesellschaft, Munich (DE)

(72) Inventors: Simon Ellgas, Mountain View, CA (US); Enrique Marcial-Simon, Veitshoechheim (DE); Thomas Stauner, Unterschleissheim (DE); Rainer Mehlhorn, Landsham (DE); Xaver Pfab, Herdweg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/109,863

(22) Filed: Aug. 23, 2018

(65) Prior Publication Data

US 2018/0361867 A1 Dec. 20, 2018

Related U.S. Application Data

(63) Continuation of application No. PCT/EP2016/079920, filed on Dec. 6, 2016.

(30) Foreign Application Priority Data

Feb. 24, 2016 (DE) .......................... 10 2016 202 813

(51) Int. Cl.
*B60L 3/00* (2019.01)
*B60L 3/12* (2006.01)
(Continued)

(52) U.S. Cl.
CPC .............. *B60L 3/0038* (2013.01); *B60L 3/12* (2013.01); *B60L 53/63* (2019.02); *B60L 53/665* (2019.02);
(Continued)

(58) Field of Classification Search
None
See application file for complete search history.

(56) References Cited

U.S. PATENT DOCUMENTS

| 7,184,903 B1 | 2/2007 | Williams et al. |
| 2008/0039980 A1* | 2/2008 | Pollack .................. B60L 53/57 700/295 |

(Continued)

FOREIGN PATENT DOCUMENTS

| DE | 10 2011 003 993 A1 | 8/2011 |
| DE | 10 2011 109 422 A1 | 2/2013 |

(Continued)

OTHER PUBLICATIONS

Malhotra et al., "Use Cases for Stationary Battery Technologies: A Review of the Literature and Existing Projects", Renewable and Sustainable Energy Reviews, 2016, pp. 705-721, vol. 56, XP029387113 (17 pages).

(Continued)

*Primary Examiner* — Sean Shechtman
(74) *Attorney, Agent, or Firm* — Crowell & Moring LLP

(57) ABSTRACT

A method controls electrical charging of a group of vehicles which are electrically connected to a power supply system of a power supply system operator, wherein the respective vehicles draw power from the power supply system for charging a vehicle-side energy store for driving the respective vehicle. A central control system can communicate with the respective vehicles of the group and also with a server of the power supply system operator, wherein the central control system, in response to a received reduction command which originates from the server of the power supply system operator, carries out a charging power reduction control operation for the group of vehicles using charging power measurement values of the respective vehicles and in the process reduces the charging power of at least some of (Continued)

the vehicle-side energy stores in order to reduce the total charging power of the groups of vehicles at least by a power value which is specified by the reduction command. The charging power measurement value of a respective vehicle is measured during charging of the vehicle and provided to the central control system, wherein one or more maximum power values for charging the respective vehicle are further predefined, which maximum power values should not be exceeded by the charging power measurement value. In the event of the charging power measurement value of the respective vehicle exceeding the minimum value from amongst all of the maximum power values and a charging power reduction control operation being imminent, the central control system uses a replacement value, which is the minimum value from amongst all of the maximum power values, instead of the measured charging power measurement value for the charging power reduction control operation.

15 Claims, 3 Drawing Sheets

(51) Int. Cl.
    *B60L 53/63*     (2019.01)
    *B60L 53/66*     (2019.01)
    *B60L 53/67*     (2019.01)
    *H02J 7/00*     (2006.01)
    *G05B 15/02*     (2006.01)

(52) U.S. Cl.
    CPC .............. *B60L 53/67* (2019.02); *G05B 15/02* (2013.01); *H02J 7/0027* (2013.01); *B60L 2240/70* (2013.01); *Y02E 60/721* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

| | | | |
|---|---|---|---|
| 2008/0040479 | A1 | 2/2008 | Bridge et al. |
| 2010/0134067 | A1 | 6/2010 | Baxter et al. |
| 2010/0301809 | A1 | 12/2010 | Bhade et al. |
| 2011/0202221 | A1 | 8/2011 | Sobue et al. |
| 2012/0235646 | A1 | 9/2012 | Lo et al. |
| 2013/0002188 | A1 | 1/2013 | Uyeki |
| 2013/0057211 | A1 | 3/2013 | Kuribayashi et al. |
| 2013/0124002 | A1 | 5/2013 | Greene et al. |
| 2013/0211988 | A1 | 8/2013 | Dorn et al. |
| 2014/0084874 | A1 | 3/2014 | Eger et al. |
| 2014/0361745 | A1 | 12/2014 | Nishita et al. |
| 2015/0298567 | A1 | 10/2015 | Uyeki |
| 2015/0346697 | A1 | 12/2015 | Mailloux et al. |
| 2016/0009192 | A1 | 1/2016 | Zhang et al. |
| 2016/0052413 | A1 | 2/2016 | Shimizu et al. |
| 2017/0166219 | A1* | 6/2017 | Jammoussi ......... B60W 50/045 |

FOREIGN PATENT DOCUMENTS

| | | |
|---|---|---|
| DE | 10 2012 103 208 A1 | 10/2013 |
| DE | 10 2013 000 981 A1 | 7/2014 |
| DE | 11 2012 005 488 T5 | 10/2014 |
| WO | WO 2012/149965 A1 | 11/2012 |
| WO | WO 2012/163396 A1 | 12/2012 |
| WO | WO 2014/083425 A2 | 6/2014 |

OTHER PUBLICATIONS

Jossen et al. Moderne Akkumulatoren richtig einsetzen 1. Ausgabe, Reichardt Verlag Untermeitingen, 2006, pp. 148-149 (three (3) pages).
English translation of document C3 (German-language Office Action previously filed on Aug. 23, 2018) (seven (7) pages).
International Search Report (PCT/ISA/210) issued in PCT Application No. PCT/EP2016/079920 dated Feb. 22, 2017 with English translation (seven pages).
German-language Written Opinion (PCT/ISA/237) issued in PCT Application No. PCT/EP2016/079920 dated Feb. 22, 2017 (nine pages).
German-language Office Action issued in counterpart German Application No. 10 2016 202 813.8 dated Nov. 11, 2016 (eight pages).
International Search Report (PCT/ISA/210) issued in PCT Application No. PCT/EP2016/079919 dated Feb. 24, 2017 with English translation (seven pages).
German-language Written Opinion (PCT/ISA/237) issued in PCT Application No. PCT/EP2016/079919 dated Feb. 24, 2017 (nine pages).
International Search Report (PCT/ISA/210) issued in PCT Application No. PCT/EP2016/079916 dated Feb. 17, 2017 with English translation (seven pages).
German-language Written Opinion (PCT/ISA/237) issued in PCT Application No. PCT/EP2016/079916 dated Feb. 17, 2017 (seven pages).

* cited by examiner

METHOD FOR CONTROLLING ELECTRICAL CHARGING OF A GROUP OF VEHICLES

CROSS REFERENCE TO RELATED APPLICATIONS

This application is a continuation of PCT International Application No. PCT/EP2016/079920, filed Dec. 6, 2016, which claims priority under 35 U.S.C. § 119 from German Patent Application No. 10 2016 202 813.8, filed Feb. 24, 2016, the entire disclosures of which are herein expressly incorporated by reference.

This application contains subject matter related to U.S. application Ser. No. 16/109,882, entitled "Method for Controlling the Electrical Charging of a Group of Vehicles" and Ser. No. 16/109,920, entitled "Method and Central Control System for Controlling the Electrical Charging of a Group of Vehicles" both filed on even date herewith.

BACKGROUND AND SUMMARY OF THE INVENTION

The invention relates to a method for controlling the electrical charging of a group of vehicles and to a corresponding control system.

The prior art discloses the practice of controlling the charging of the energy stores of a group or pool of electrically drivable vehicles via a control system in such a manner that requirements of the operator of the power supply system used for charging with regard to a power reduction are also taken into account. In other words, in the case of a corresponding requirement of the power supply system operator, it is possible to interrupt or delay the charging of particular vehicles in the vehicle pool in order to thereby reduce the power consumption in the power supply system. In this case, the charging of only those vehicles in which the interruption in the charging operation does not influence a departure time specified by the user of the vehicle is suspended, that is to say there is still sufficient available time to charge the vehicle completely or to a predefined state of charge in the event of subsequent resumption of the charging operation.

During the above control of the charging of a vehicle pool, currently measured charging power measured values of the individual charging vehicles are taken into account in order to thereby ensure that a sufficient number of vehicles also suspend their charging operation, thus achieving the power reduction desired by the power supply system operator. However, the problem may arise in this case of particular charging power measured values being implausible since they exceed one or more predetermined maximum power measured values even though such exceeding could actually not occur. The use of implausible charging power measured values when controlling the charging of a vehicle pool may result, under certain circumstances, in the power reduction desired by the power supply system operator not being achieved.

Therefore, the object of the invention is to provide a method for controlling the electrical charging of a group of vehicles in such a manner that, even if implausible charging power measured values occur, the power reduction desired by a power supply system operator is achieved with a high degree of probability.

This and other objects are achieved by the method according to the invention for controlling the electrical charging of a group of vehicles which are electrically connected to a power supply system of a power supply system operator, wherein the respective vehicles draw power for charging a vehicle energy store for driving the respective vehicle from the power supply system. In other words, the vehicles are electrically drivable vehicles, for example pure electric vehicles or hybrid vehicles. In the method according to the invention, a central control system can communicate with the respective vehicles in the group and with a server of the power supply system operator. A central control system should be understood in this case as meaning a control system or a control device which controls the charging of all vehicles in the group. This control system is implemented, in particular, using software on a corresponding server. The central control system, in response to a received reduction command which comes from the server of the power supply system operator, controls a charging power reduction for the group of vehicles using charging power measured values of the respective vehicles. During this control, the central control system reduces the charging power of at least some of the vehicle energy stores. The charging of at least some of the vehicle energy stores is preferably suspended. This reduction in the charging power is intended to reduce the total charging power of the group of vehicles at least by a power value specified by the reduction command.

Within the scope of the method according to the invention, the charging power measured value of a respective vehicle is measured during the charging of the latter and is made available to the central control system. For example, the charging power measured value can be stored in a central store, for example a cloud store, and can then be retrieved by the control system. In one preferred variant, the charging power measured value is captured by a corresponding measuring device which is integrated, for example, in the charging station to which the respective vehicle is connected. In the method according to the invention, one or more maximum power values for charging the respective vehicle are also predefined and are not intended to be exceeded by the charging power measured value. In one preferred variant, the maximum power value(s) comprise(s) one or more of the following values and possibly also all of the following values:

- a charging station maximum value which indicates the maximum charging power of the charging station at which the respective vehicle is charged;
- a vehicle maximum value which indicates the maximum charging power of the respective vehicle;
- a user maximum value which indicates a maximum charging power which can be configured by the user for the respective vehicle.

The charging station maximum value is preferably the maximum physically possible charging power value for the charging station, but may possibly also be below this value. The vehicle maximum value is preferably the maximum physically possible charging power value of the corresponding vehicle, but may possibly also be below this value. The user maximum value is preferably not greater than the vehicle maximum value and preferably also not greater than the charging station maximum value. The charging station maximum value is preferably above the vehicle maximum value or is the same as the vehicle maximum value.

The method according to the invention is distinguished by the fact that, if the charging power measured value of the respective vehicle exceeds the minimum value of all maximum power values and charging power reduction control is imminent, the central control system uses a replacement value, which is the minimum value of all maximum power values, instead of the measured charging power measured value to control the charging power reduction when it occurs. Otherwise, that is to say if the charging power measured value of the respective vehicle does not exceed the minimum value of all maximum power values and charging power reduction control is imminent, the central control system uses the measured charging power measured value to control the charging power reduction.

In the method according to the invention, use is made of the knowledge that an implausible charging power measured value should be set as low as possible before the start of the corresponding charging power reduction control in order to avoid a charging power measured value which is incorrectly assumed to be too high from resulting in the power not being sufficiently reduced according to the reduction command of the power supply system operator.

In one preferred embodiment of the method according to the invention, the scenario is also considered in which an implausible charging power measured value occurs during charging power reduction control which is currently being carried out, for example at the time at which the corresponding vehicle is connected to a charging station. In this variant, the maximum power values comprise the charging station maximum value, the vehicle maximum value and the user maximum value. In this case, if the charging power measured value of the respective vehicle exceeds the minimum value of the charging station maximum value and the vehicle maximum value, the central control system uses a replacement value, which is the minimum value of the charging station maximum value and the vehicle maximum value, instead of the measured charging power measured value to control the current charging power reduction. Otherwise, that is to say if the charging power measured value of the respective vehicle does not exceed the minimum value of the charging station maximum value and the vehicle maximum value during charging power reduction control which is currently being carried out, the central control system uses the measured charging power measured value to control the charging power reduction. In this embodiment, use is made of the knowledge that, on account of the configurability of the user maximum value, the vehicle maximum value or the charging station maximum value is present with a higher degree of probability than the user maximum value in the case of implausible measured values. It is also taken into account that a charging power measured value which is incorrectly assumed to be too low during charging power reduction control which is currently being carried out can result in the charging power of other vehicles not being reduced enough and the requirements according to the reduction command of the power supply system operator therefore not being achieved.

In another particularly preferred embodiment, the central control system can also process corresponding increase commands of the power supply system operator. In other words, in response to a received increase command which comes from the server of the power supply system operator, the central control system controls a charging power increase for the group of vehicles using the charging power measured values of the respective vehicles. During this charging power increase control, the control system increases the charging power of at least some of the vehicle energy stores in order to increase the total charging power of the group of vehicles at least by a power value specified by the increase command. Implausible charging power measured values are also preferably suitably processed in the case of such an increase command in order to ensure to the greatest possible extent that the charging power is increased according to the increase command.

In one variant of the method according to the invention, if the charging power measured value of the respective vehicle exceeds the minimum value of all maximum power values and charging power increase control is currently being carried out, the central control system uses a replacement value, which is the minimum value of all maximum power values, instead of the measured charging power measured value to control the current charging power increase. Otherwise, that is to say if the charging power measured value of the respective vehicle does not exceed the minimum value of all maximum power values and charging power increase control is currently being carried out, the central control system uses the measured charging power measured value to control the charging power increase. This embodiment takes into account the fact that a charging power measured value which is incorrectly assumed to be too high can result, during ongoing charging power increase control, in sufficient power no longer being provided by other vehicles in order to achieve the power value according to the increase command.

In another variant, if the charging power measured value of the respective vehicle exceeds the minimum value of the charging station maximum value and the vehicle maximum value and charging power increase control is imminent, the central control system uses a replacement value, which is the minimum value of the charging station maximum value and the vehicle maximum value, instead of the measured charging power measured value to control the charging power increase when it occurs. Otherwise, that is to say if the charging power measured value of the respective vehicle does not exceed the minimum value of the charging station maximum value and the vehicle maximum value and charging power increase control is imminent, the central control system uses the measured charging power measured value to control the charging power increase. In this variant, the maximum power values comprise the charging station maximum value, the vehicle maximum value and the user maximum value. In this case, it is taken into account that the charging station maximum value or the vehicle maximum value is present with a higher degree of probability than the configurable user maximum value. It is also taken into account that a charging power measured value which is incorrectly set to be too low can result, before the start of charging power increase control, in the power of other vehicles no longer being sufficiently increased, when increasing the charging power of the corresponding vehicle at the start of the power increase control, to achieve the power increase according to the increase command.

In another variant of the method according to the invention, when controlling the charging power reduction and/or the charging power increase, the central control system corrects the charging power measured value or replacement value used in the process on the basis of a degradation function which describes a decrease in the charging power of the vehicle energy store as the fully charged state is approached. In this manner, the charging power measured value or the replacement value is set more accurately on the basis of the state of charge of the energy store.

In addition to the method described above, the invention relates to a central control system for controlling the electrical charging of a group of vehicles which are electrically connected to a power supply system of a power supply system operator, wherein the respective vehicles draw power for charging a vehicle energy store for driving the respective vehicle from the power supply system. The central control system can communicate with the respective vehicles in the group and with a server of the power supply system operator, wherein the central control system is set up, in response to a received reduction command which comes from the server of the power supply system operator, to control a charging power reduction for the group of vehicles using charging power measured values of the respective vehicles and in the process to reduce the charging power of at least some of the vehicle energy stores in order to reduce the total charging power of the group of vehicles at least by a power value specified by the reduction command. In this case, the central control system is set up to carry out a method in which:

the charging power measured value of a respective vehicle which is measured during the charging of the latter is made available to the central control system, wherein one or more maximum power values for charging the respective vehicle are also predefined and are not intended to be exceeded by the charging power measured value;

if the charging power measured value of the respective vehicle exceeds the minimum value of all maximum power values and charging power reduction control is imminent, the central control system uses a replacement value, which is the minimum value of all maximum power values, instead of the measured charging power measured value to control the charging power reduction, wherein, if the charging power measured value of the respective vehicle does not exceed the minimum value of all maximum power values and charging power reduction control is imminent, the central control system uses the measured charging power measured value to control the charging power reduction.

The control system just described is preferably configured in such a manner that it can carry out one or more preferred variants of the method according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
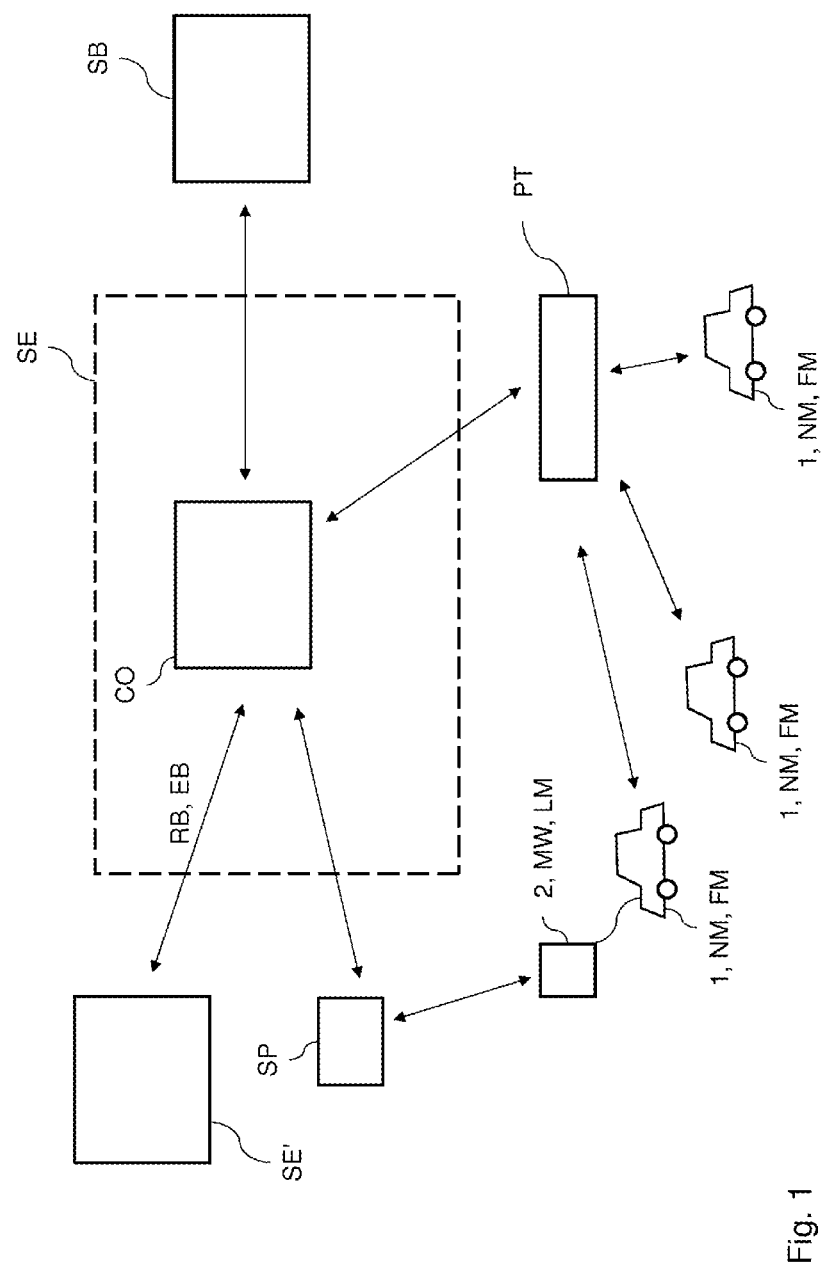
FIG. 1 is a schematic illustration of a structure in which one embodiment of the method according to the invention is carried out.

FIG. 1 shows a schematic illustration of an infrastructure for carrying out the method according to the invention. A core component of this infrastructure is a central control unit CO which is integrated in a server SE and is used to control the charging of a pool or fleet of a plurality of electrically driven vehicles (that is to say the traction batteries of these vehicles). Three electric vehicles 1 from this vehicle pool are represented, for example. These vehicles are connected to the control unit CO, in terms of communication, via a portal PT. The control system CO has access, via a suitable control backend (not shown), to the portal PT which in turn can communicate with the individual vehicles 1, for example via SMS.

Each individual vehicle 1 in the vehicle fleet is associated with a user who can communicate, on the one hand, with the control system CO via the control backend (not shown) and, on the other hand, with his vehicle via the portal PT using a terminal (not shown), for example a smartphone. In particular, during charging of the traction battery of his vehicle from a power supply system, the user can use his terminal to specify various parameters relating to the charging operation. The user can specify, inter alia, a charging time window in which charging is particularly favorable. The battery is then preferably charged in the charging time window. The user can likewise specify a departure time and the desired state of charge at the departure time (generally 100%). These data are transmitted both to the central control system CO and to the vehicle 1 belonging to the user via the user's terminal. As a further parameter, the user can configure a user maximum value NM which corresponds to a maximum desired charging power for his vehicle. This value is also transmitted both to the central control system CO and to the vehicle via the user's terminal. Furthermore, each vehicle stores a vehicle maximum value FM which represents the maximum physically possible charging power for the vehicle. This vehicle maximum value is known to the control system CO, that is to say it was transmitted to the control system at an earlier time.

Each of the vehicles is connected to a corresponding charging station 2 for charging, in which case this is indicated only for the left-hand vehicle in FIG. 1 for reasons of clarity. The charging station is in turn connected to the power supply system (not shown) of a power supply system operator. The server SE' described further below belongs to this power supply system operator. During charging, the charging station captures the current charging power measured values MW using a measuring device (not shown) and transmits these measured values to a cloud store SP. The central control system CO can retrieve these measured values from the store SP. There exists, for the charging station 2, a charging station maximum value LM which represents the maximum physically possible charging power for this charging station. This charging station maximum value is known to the control system CO, that is to say it was transmitted to the control system at an earlier time. The above vehicle maximum value FM can be 7 kW, for example, the above charging station maximum value LM can be 8 kW, for example, and the above user maximum value can be 4 kW, for example. If necessary, yet further maximum power values can also be predefined for charging the corresponding vehicle. Although the values LM, FM and NM are denoted with the same reference symbol in FIG. 1, they may differ from vehicle to vehicle or from charging station to charging station.

According to FIG. 1, the control system CO also communicates with the server SE'. As mentioned above, the server SE' belongs to the power supply system operator, from whose power supply system the vehicles 1 in the vehicle fleet or their batteries are charged. In addition, an energy storage system in the form of a stationary battery store SB which can be controlled via the control system CO by means of a suitable interface and belongs to the operator of the control system CO is provided in the infrastructure in FIG. 1. The operator of the control system is, for example, the manufacturer of the vehicles 1 in the vehicle fleet.

One aim of the infrastructure in FIG. 1 is for the power supply system operator to be able to send reduction commands RB to the control system CO via its server SE' in the event of an overload in its power supply system. In response to a reduction command, the control system CO then controls the charging of the vehicles in the vehicle pool in such a manner that the power consumption of the vehicle pool is reduced (at least) by a predefined power value, wherein this power value is specified in the reduction command RB. In order to reduce the power by this power value, the control system suspends the charging operation for a particular suspension period in at least some of the vehicles which are currently charging. In the embodiment described here, the suspension period is permanently predefined and is one hour. In this case, only the charging operation of those vehicles in which it is ensured that sufficient power is still available to charge the traction battery of the corresponding vehicle to the desired state of charge until the departure time, after the charging operation has been resumed after the suspension period, is suspended. If the situation occurs in which the charging power of all vehicles cannot be reduced by the desired power value according to the reduction command RB, the control system CO also controls the stationary battery store SB in such a manner that it feeds an amount of power into the power supply system, which amount of power corresponds to the power which is still lacking before a reduction by the power value is achieved. This ensures that the power balance according to the power value of the reduction command RB is achieved.

In the embodiment described here, it is also optionally possible for the power supply system operator to send increase commands EB to the central control system CO via the server SE'. These increase commands are used to instruct the control system to increase the charging powers of the vehicles in the vehicle fleet by a power value which is again stipulated in the increase command. Such an increase command is then sent from the server SE' to the control system CO if there is excess power in the power supply system which should be consumed as quickly as possible.

When controlling the power both in order to reduce and in order to increase the total power of the vehicle pool, the central control unit CO processes the current charging power measured values MW which are retrieved from the cloud store SP by the control system. In this case, the situation can occur in which the charging power measured value MW of one or more vehicles is not plausible since it exceeds one or more of the maximum power values LM, NM and FM, that is to say the user maximum value NM and/or the vehicle maximum value FM and/or the charging station maximum value LM. In this case, it should be noted that the user maximum value cannot be set by the user to be higher than the physical vehicle maximum value FM and also generally higher than the charging station maximum value LM. The embodiment described here provides a method of handling implausible charging power measured values MW, with the result that it can be ensured with a high degree of probability that, despite implausible charging power measured values, the desired power reduction according to a reduction command RB or the desired power increase according to an increase command EB is achieved.

One embodiment of the invention in the case of a reduction command RB is explained below, by way of example. In this case, a distinction is made between two scenarios. In a first scenario, power control for reducing the power when the implausible measured value occurs has not yet started. Nevertheless, it is already known that such power control is imminent. For example, the reduction command RB may have already been transmitted from the server SE', but it may be stipulated in this command that the reduction of the power is intended to begin only at a future time. The control system may likewise have already been informed, for example by means of a previously transmitted command, that a command RB to reduce the power will soon be given. The occurrence of the implausible measured value is usually correlated with the connection of the corresponding vehicle, which provides an implausible charging power measured value, to the charging station. In contrast to the first scenario just described, an implausible charging power measured value occurs in the second scenario under consideration in a vehicle during charging power control which is already being carried out. The occurrence of this implausible value is again generally correlated with the connection of the corresponding vehicle to the charging station.

Figure 2:
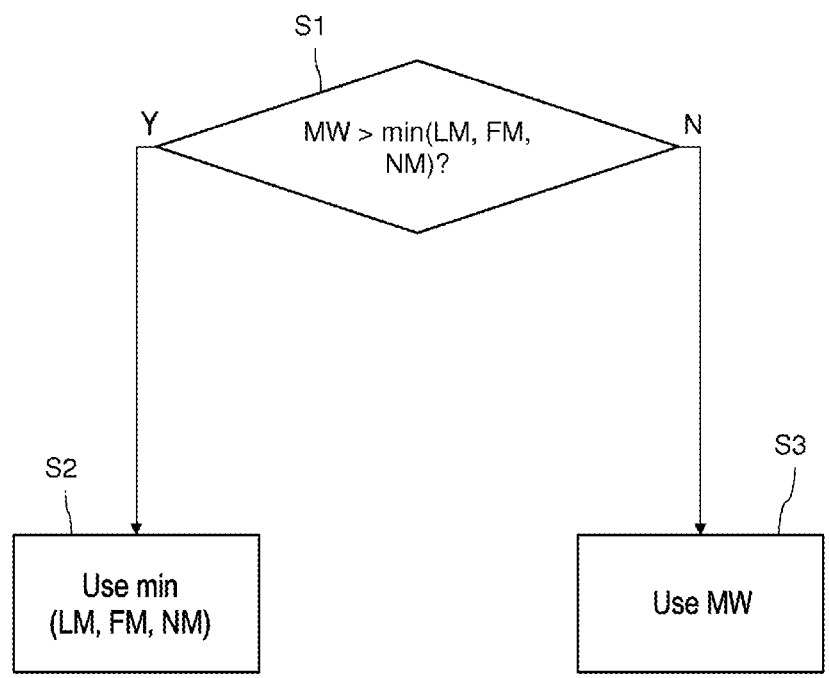
FIG. 2 is a flowchart which illustrates the sequence of one embodiment of the method according to the invention in the event of imminent power reduction control.

FIG. 2 shows a flowchart for the first scenario in which the charging power control by the control system CO has not yet begun. For each of the charging power measured values, step S1 checks whether the corresponding measured value MW is greater than the minimum of the maximum power values LM, FM and NM. If this is the case (branch Y from step S1), the corresponding power measured value MW is classified as implausible and the process skips to step S2. According to step S2, the corresponding charging power reduction in the future charging power control is then determined on the basis of the minimum of the three maximum values LM, FM and NM, rather than on the basis of the actual charging power measured value. In this case, it is taken into account that a charging power measured value which is incorrectly set to be too high can result, under certain circumstances, in an inadequate power reduction if the charging of the vehicle with the implausible charging power measured value is suspended.

If it is determined in step S1 in FIG. 2 that the charging power measured value MW does not exceed the minimum of the maximum power values LM, FM and NM (branch N from step S1), the measured value MW is considered to be plausible and this value is used in step S3 in the charging power control for reducing the charging power. If the control system processes an increase command EB instead of a reduction command RB, the control according to FIG. 2 is used when charging power control for increasing the charging power is already in progress.

Figure 3:
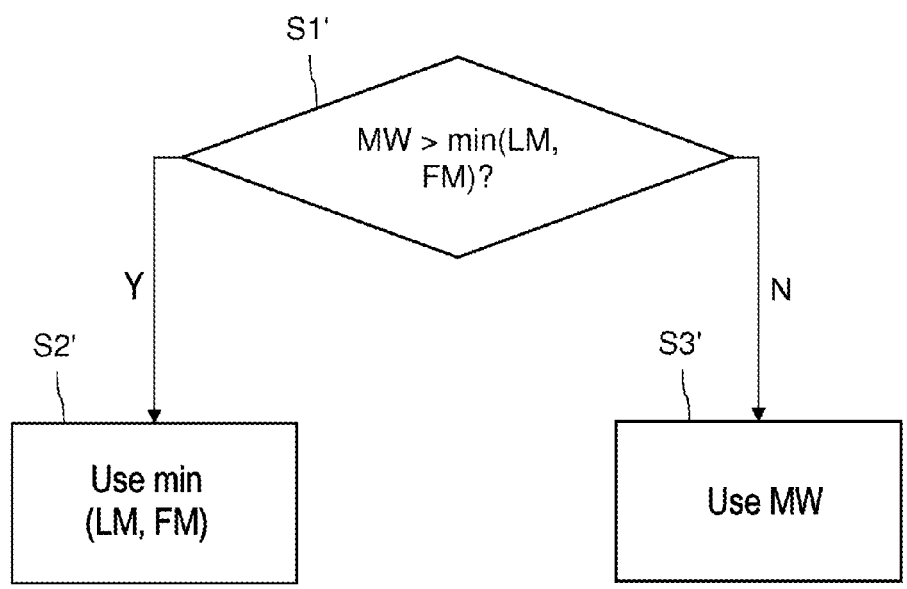
FIG. 3 is a flowchart which illustrates the sequence of one embodiment of the method according to the invention in the event of power reduction control which is currently being carried out.

FIG. 3 shows the second scenario above in which charging power control for reducing the total power is already being carried out by the control system CO when an implausible measured value occurs. In other words, charging power control has already been started in response to a reduction command RB. According to FIG. 3, step S1' checks whether the charging power measured value MW of a respective vehicle is greater than the minimum of the maximum power measured values LM and FM. If this is the case (branch Y from step S1'), the minimum of the maximum power measured values LM and FM is taken into account by the control unit CO instead of the actual power measured value during control for increasing the power. If the condition according to step S1' has not been met (branch N from step S1'), the actual power measured value is processed by the control system CO during control for increasing the power.

According to FIG. 3, use is made of the knowledge that a charging power measured value which is incorrectly selected to be too small can result, when reducing the charging power of the vehicle fleet, in the power being reduced too little by suspending the charging operation of other vehicles, with the result that the desired power reduction is not achieved. If there is charging power control in order to increase the charging power, the sequence according to FIG. 3 is used whenever the corresponding charging power control is imminent, that is to say has not yet started.

The embodiments of the invention described above have a number of advantages. In particular, in the event of implausible charging power measured values when charging a vehicle pool, the charging power is controlled, in response to a command to reduce or increase the charging power, in such a manner that there is a high degree of certainty that the power reduction or power increase desired by the power supply system operator will be guaranteed.

LIST OF REFERENCE SYMBOLS

1 Vehicle
2 Charging station
SP Cloud store
SE, SE' Server
CO Central control system
SB Stationary battery store
PT Portal
RB Reduction command
EB Increase command
MW Charging power measured value
LM Charging station maximum value
NM User maximum value
FM Vehicle maximum value
S1, S2, S3, S1', S2', S3' Steps
Y Yes
N No The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling electrical charging of a group of vehicles which are electrically connected to a power supply system of a power supply system operator, wherein the respective vehicles draw power for charging a vehicle energy store for driving the respective vehicle from the power supply system, wherein a central control system can communicate with the respective vehicles in the group and with a server of the power supply system operator, wherein the central control system, in response to a received reduction command which comes from the server of the power supply system operator, controls a charging power reduction for the group of vehicles using charging power measured values of the respective vehicles and in the process reduces the charging power of at least some of the vehicle energy stores in order to reduce the total charging power of the group of vehicles at least by a power value specified by the reduction command, wherein the method comprises the steps of:

measuring the charging power measured value of a respective vehicle during the charging of the latter and making it available to the central control system, wherein one or more maximum power values for charging the respective vehicle are also predefined and are not intended to be exceeded by the charging power measured value;

controlling the charging power reduction, via the central control system, using a replacement value, which is the minimum value of all maximum power values, instead of the measured charging power measured value, in response to the charging power measured value of the respective vehicle exceeding the minimum value of all maximum power values and charging power reduction control being imminent, and controlling the charging power reduction, via the central control system, using the measured charging power measured value, in response to the charging power measured value of the respective vehicle not exceeding the minimum value of all maximum power values and charging power reduction control being imminent.

2. The method as claimed in claim 1, wherein the maximum power values comprise one or more of:

a charging station maximum value which indicates the maximum charging power of the charging station at which the respective vehicle is charged;

a vehicle maximum value which indicates the maximum charging power of the respective vehicle; or a user maximum value which indicates a maximum charging power which is configurable by the user for the respective vehicle.

3. The method as claimed in claim 2, wherein the maximum power values comprise the charging station maximum value, the vehicle maximum value and the user maximum value, and if the charging power measured value of the respective vehicle exceeds the minimum value of the charging station maximum value and the vehicle maximum value and charging power reduction control is currently being carried out, the central control system uses a replacement value, which is the minimum value of the charging station maximum value and the vehicle maximum value, instead of the measured charging power measured value to control the charging power reduction, and if the charging power measured value of the respective vehicle does not exceed the minimum value of the charging station maximum value and the vehicle maximum value and charging power reduction control is imminent, the central control system uses the measured charging power measured value to control the charging power reduction.

4. The method as claimed in claim 1, wherein in response to a received increase command which comes from the server of the power supply system operator, the central control system also controls a charging power increase for the group of vehicles using the charging power measured values of the respective vehicles and in the process increases the charging power of at least some of the vehicle energy stores in order to increase the total charging power of the group of vehicles at least by a power value specified by the increase command.

5. The method as claimed in claim 4, wherein if the charging power measured value of the respective vehicle exceeds the minimum value of all maximum power values and charging power increase control is currently being carried out, the central control system uses a replacement value, which is the minimum value of all maximum power values, instead of the measured charging power measured value to control the charging power increase, and if the charging power measured value of the respective vehicle does not exceed the minimum value of all maximum power values and charging power increase control is currently being carried out, the central control system uses the measured charging power measured value to control the charging power increase.

6. The method as claimed in claim 4, wherein
the maximum power values comprise a charging station maximum value, a vehicle maximum value and a user maximum value, and
if the charging power measured value of the respective vehicle exceeds the minimum value of the charging station maximum value and the vehicle maximum value and charging power increase control is imminent, the central control system uses a replacement value, which is the minimum value of the charging station maximum value and the vehicle maximum value, instead of the measured charging power measured value to control the charging power increase, and
if the charging power measured value of the respective vehicle does not exceed the minimum value of the charging station maximum value and the vehicle maximum value and charging power increase control is imminent, the central control system uses the measured charging power measured value to control the charging power increase.

7. The method as claimed in claim 5, wherein
the maximum power values comprise a charging station maximum value, a vehicle maximum value and a user maximum value, and
if the charging power measured value of the respective vehicle exceeds the minimum value of the charging station maximum value and the vehicle maximum value and charging power increase control is imminent, the central control system uses a replacement value, which is the minimum value of the charging station maximum value and the vehicle maximum value, instead of the measured charging power measured value to control the charging power increase, and
if the charging power measured value of the respective vehicle does not exceed the minimum value of the charging station maximum value and the vehicle maximum value and charging power increase control is imminent, the central control system uses the measured charging power measured value to control the charging power increase.

8. The method as claimed in claim 1, wherein
when controlling the charging power reduction and/or the charging power increase, the central control system corrects the charging power measured value or replacement value used in the process on the basis of a degradation function which describes a decrease in the charging power of the vehicle energy store as the fully charged state is approached.

9. A central control system for controlling electrical charging of a group of vehicles which are electrically connected to a power supply system of a power supply system operator, wherein the respective vehicles draw power for charging a vehicle energy store for driving the respective vehicle from the power supply system, wherein the central control system communicates with the respective vehicles in the group and with a server of the power supply system operator, wherein the central control system comprises:
a control unit operatively configured to, in response to a received reduction command which comes from the server of the power supply system operator, control a charging power reduction for the group of vehicles using charging power measured values of the respective vehicles and in the process reduce the charging power of at least some of the vehicle energy stores in order to reduce the total charging power of the group of vehicles at least by a power value specified by the reduction command, wherein the control unit is further operatively configured to:
receive the charging power measured value of a respective vehicle which is measured during the charging of the latter, wherein one or more maximum power values for charging the respective vehicle are also predefined and are not intended to be exceeded by the charging power measured value,
if the charging power measured value of the respective vehicle exceeds the minimum value of all maximum power values and charging power reduction control is imminent, control the charging power reduction, via the control unit, using a replacement value, which is the minimum value of all maximum power values, instead of the measured charging power measured value, and
if the charging power measured value of the respective vehicle does not exceed the minimum value of all maximum power values and charging power reduction control is imminent, control the charging power reduction, via the control unit, using the measured charging power measured value.

10. The central control system as claimed in claim 9, wherein
the maximum power values comprise one or more of:
a charging station maximum value which indicates the maximum charging power of the charging station at which the respective vehicle is charged;
a vehicle maximum value which indicates the maximum charging power of the respective vehicle; or
a user maximum value which indicates a maximum charging power which is configurable by the user for the respective vehicle.

11. The central control system as claimed in claim 10, wherein
the maximum power values comprise the charging station maximum value, the vehicle maximum value and the user maximum value, and
if the charging power measured value of the respective vehicle exceeds the minimum value of the charging station maximum value and the vehicle maximum value and charging power reduction control is currently being carried out, the central control system uses a replacement value, which is the minimum value of the charging station maximum value and the vehicle maximum value, instead of the measured charging power measured value to control the charging power reduction, and
if the charging power measured value of the respective vehicle does not exceed the minimum value of the charging station maximum value and the vehicle maximum value and charging power reduction control is imminent, the central control system uses the measured charging power measured value to control the charging power reduction.

12. The central control system as claimed in claim 9, wherein
in response to a received increase command which comes from the server of the power supply system operator, the central control system also controls a charging power increase for the group of vehicles using the charging power measured values of the respective vehicles and in the process increases the charging power of at least some of the vehicle energy stores in order to increase the total charging power of the group of vehicles at least by a power value specified by the increase command.

13. The central control system as claimed in claim 12, wherein
- if the charging power measured value of the respective vehicle exceeds the minimum value of all maximum power values and charging power increase control is currently being carried out, the central control system uses a replacement value, which is the minimum value of all maximum power values, instead of the measured charging power measured value to control the charging power increase, and
- if the charging power measured value of the respective vehicle does not exceed the minimum value of all maximum power values and charging power increase control is currently being carried out, the central control system uses the measured charging power measured value to control the charging power increase.

14. The central control system as claimed in claim 12, wherein
- the maximum power values comprise a charging station maximum value, a vehicle maximum value and a user maximum value, and
- if the charging power measured value of the respective vehicle exceeds the minimum value of the charging station maximum value and the vehicle maximum value and charging power increase control is imminent, the central control system uses a replacement value, which is the minimum value of the charging station maximum value and the vehicle maximum value, instead of the measured charging power measured value to control the charging power increase, and
- if the charging power measured value of the respective vehicle does not exceed the minimum value of the charging station maximum value and the vehicle maximum value and charging power increase control is imminent, the central control system uses the measured charging power measured value to control the charging power increase.

15. The central control system as claimed in claim 9, wherein
- the maximum power values comprise a charging station maximum value, a vehicle maximum value and a user maximum value, and
- if the charging power measured value of the respective vehicle exceeds the minimum value of the charging station maximum value and the vehicle maximum value and charging power increase control is imminent, the central control system uses a replacement value, which is the minimum value of the charging station maximum value and the vehicle maximum value, instead of the measured charging power measured value to control the charging power increase, and
- if the charging power measured value of the respective vehicle does not exceed the minimum value of the charging station maximum value and the vehicle maximum value and charging power increase control is imminent, the central control system uses the measured charging power measured value to control the charging power increase.

* * * * *